(12) United States Patent
Kim et al.

(10) Patent No.: US 7,336,324 B2
(45) Date of Patent: Feb. 26, 2008

(54) ARRAY SUBSTRATE FOR LIQUID CRYSTAL DISPLAY DEVICE AND FABRICATING METHOD THEREOF

(75) Inventors: Jin-Young Kim, Icheon (KR); Gyoo-Chul Jo, Gyeonggi-do (KR); Kyu-Tae Lee, Gyeongsangbuk-do (KR); Beung-Hwa Jeong, Gyeongsangbuk-do (KR); Jin-Gyu Kang, Incheon (KR)

(73) Assignee: LG.Philips LCD Co., Ltd., Seoul (KR)

( * ) Notice: Subject to any disclaimer, the term of this patent is extended or adjusted under 35 U.S.C. 154(b) by 62 days.

(21) Appl. No.: 10/964,922

(22) Filed: Oct. 15, 2004

(65) Prior Publication Data

US 2005/0122443 A1 Jun. 9, 2005

(30) Foreign Application Priority Data

Dec. 4, 2003 (KR) .................. 10-2003-0087674

(51) Int. Cl.
*G02F 1/136* (2006.01)
*H01I 29/06* (2006.01)

(52) U.S. Cl. .................. 349/43; 257/59
(58) Field of Classification Search .......... 349/43, 349/139; 257/59, 72
See application file for complete search history.

(56) References Cited

U.S. PATENT DOCUMENTS

| 6,008,869 | A | * | 12/1999 | Oana et al. | .................. 349/43 |
| 2002/0180900 | A1 | * | 12/2002 | Chae et al. | .................. 349/43 |
| 2003/0058379 | A1 | * | 3/2003 | Lee | .................. 349/43 |
| 2004/0227875 | A1 | * | 11/2004 | Park et al. | .................. 349/113 |

\* cited by examiner

*Primary Examiner*—Toan Ton
(74) *Attorney, Agent, or Firm*—McKenna, Long & Aldridge, LLP

(57) ABSTRACT

A semiconductor device includes a substrate having source and drain regions, a gate insulating layer on the substrate, a gate electrode on the gate insulating layer, an interlayer on the gate electrode, a source electrode connected to the source region, and a drain electrode connected to the drain region, wherein at least one of the gate electrode, the source electrode and the drain electrode includes a first metal layer of molybdenum (Mo)-titanium (Ti) alloy, a second metal layer of one of metallic metals including copper (Cu), aluminum (Al), silver (Ag) and gold (Au) on the first metal layer.

19 Claims, 23 Drawing Sheets

ARRAY SUBSTRATE FOR LIQUID CRYSTAL DISPLAY DEVICE AND FABRICATING METHOD THEREOF

The present invention claims the benefit of Korean Patent Application No. 2003-0087674, filed in Korea on Dec. 4, 2003, which is hereby incorporated by reference.

BACKGROUND OF THE INVENTION

1. Field of the Invention

The present invention relates to a liquid crystal display (LCD) device, more particularly an array substrate for a liquid crystal display (LCD) device and a fabricating method thereof.

2. Discussion of the Related Art

LCD devices have been developed as next generation display devices because of their lightweight, thin profile, and low power consumption. In general, an LCD device is a non-emissive display device that displays images using optical anisotropic properties of a liquid crystal material that is interposed between a thin film transistor (TFT) array substrate and a color filter (C/F) substrate. Presently, among the various types of LCD devices commonly used, active matrix LCD (AM-LCD) devices have a high resolution and are superior in displaying moving images.

The AM-LCD device includes a thin film transistor (TFT) at each pixel region as a switching device, a first electrode for ON/OFF, and a second electrode used for a common electrode. The operational properties of LCD devices depends on the resistance of the electrodes connecting the TFT and on the resistance of the lines applying signals to the electrode. Therefore, a material selection of the electrodes and lines is very important.

FIG. 1 is a schematic plan view showing an array substrate for a liquid crystal display device according to the related art. As shown in FIG. 1, thin film transistors (TFTs) T in matrix are formed on a substrate 10, referred to as an array substrate. The TFTs T act as switching devices. Each TFT T includes a gate electrode 14, an active layer 20 over the gate electrode 14, and source and drain electrodes 24 and 26. Moreover, each TFT T is connected to a gate line 12 and a data line 28.

A pixel region P is defined by the gate line 12 and the data line 28. A pixel electrode 34 is formed in the pixel region P and is connected to the thin film transistor T. The gate electrode 14 extends from the gate line 12, the source electrode 24 extends from the data line 28, and the drain electrode 26 is spaced apart from the source electrode 24. A gate pad 16 is formed at one end of the gate line 12 and a data pad 30 is formed at one end of the data line 28. The gate pad 16 is wider than the gate line 12 and the data pad 30 is wider than the data line 28. A gate pad terminal 36 and a data pad terminal 38 are formed over the substrate 10 and are connected to the gate pad 16 and data pad 30, respectively. The gate and data pad terminals 36 and 38 are formed of transparent conductive materials, such as indium tin zinc oxide (ITZO).

Although not shown, the gate electrode 14, the gate line 12 and the gate pad 16 are formed of a low resistance metal layer, such as aluminum (Al) and Al alloy, and a barrier metal layer, such as molybdenum (Mo) and chromium (Cr) underneath the low resistance metal layer. Similarly, although not shown, the source electrode 24, drain electrode 26, the data line 28 and the data pad 30 include the same low resistance metal layer as the gate electrode 14, the gate line 12 and the gate pad 16, and lower and upper barrier metal layers. At this time, the low resistance metal layer for the source electrode 24, drain electrode 26, the data line 28 and the data pad 30 is interposed between the lower and upper barrier metal layers.

FIGS. 2A to 2E, 3A to 3E and 4A to 4E are schematic cross-sectional views taken along lines II-II, III-III and IV-IV in FIG. 1 that show the fabricating process of an array substrate for a liquid crystal display device. FIGS. 2A to 2E show one pixel region that includes a thin film transistor. FIGS. 3A to 3E show an area of a gate pad, and FIGS. 4A to 4E show any area of a data pad.

As shown in FIGS. 2A, 3A and 4A, a gate line 12, a gate electrode 14 and a gate pad 16 are formed on a substrate 10 as a double metal layer such that a first metal layer 11a is formed of Al or Al alloy and a second metal layer 11b is formed of chromium (Cr), titanium (Ti), molybdenum (Mo), tantalum (Ta) and Mo-tungsten (W) alloy. For convenience, the gate line 12, the gate electrode 14 and the gate pad 16 will subsequently be collectively referred to as a gate pattern 11.

In FIGS. 2B, 3B and 4B, a gate insulating layer 18 of an insulating material, such as silicon nitride (SiNx), is formed over the entire surface of the gate pattern 11. Sequentially, an active layer 20 of intrinsic amorphous silicon and an ohmic contact layer 22 of impurity-doped amorphous silicon are formed on the gate insulating layer 18.

Next, as shown in FIGS. 2C, 3C and 4C, a source electrode 24, a drain electrode 26, a data line 28 and a data pad 30 are formed as a triple metal layer over the substrate 10 having the active layer 20 and the ohmic contact layer 22. For convenience, the source electrode 24, the drain electrode 26, the data line 28 and the data pad 30 will subsequently be collectively referred to as a data pattern 23.

As shown in regions EV1 and EV2 of FIGS. 2C and 4C, the drain electrode 26 and the data pad 30 include a third metal layer 23a of the same material as the first metal layer 11a in FIGS. 2A, 3A and 4A, a fourth metal layer 23b of the same material as the second metal layer 11b in FIGS. 2A, 3A and 4A, and a fifth metal layer 23c of the same material as the third metal layer 23a. Although not shown, the source electrode 24 and the data line 28 have the same laminated structure as the drain electrode 26 and the data pad 30.

The third metal layer 23a functions as a barrier layer for the fourth metal layer 23b to reduce contact resistance of the fourth metal layer 23b with the ohmic contact layer 22. The fifth metal layer 23c functions as another barrier layer for the fourth metal layer 23b to reduce contact resistance of the fourth metal layer 23b with a transparent conductive metal layer that will be formed in a subsequent process. When the fourth metal layer 23b is formed of intrinsic Al, the third metal layer 23a prevents a spiking phenomenon of the fourth metal layer 23b. The spiking phenomenon is a contact defect between an Al layer and a silicon layer, such as the fourth metal layer 23b and the ohmic contact layer 22. The third metal layer 23a also prevents the formation of Al oxide ($Al_2O_3$) caused by oxidation on the surface of the fourth layer 23b. When the fourth metal layer 23b is selected from Al or Al alloy, for example, and the third and fifth metal layers 23a and 23c is selected from Cr or Mo, for example.

Next, as shown in FIGS. 2D, 3D and 4D, a passivation layer 32 is formed of inorganic materials, such as SiNx and SiOx, or organic materials, such as benzocyclobutene (BCB) and acrylic resin. A first contact hole C1 in the passivation layer 32 exposes a portion of the drain electrode 26. A second contact hole C2 in the passivation layer 32 exposes a portion of the gate pad 16. A third contact hole C3 in the passivation layer 32 exposes a portion of the data pad 30.

The second contact hole C2 is also formed in the gate insulating layer 18 as well as the passivation layer 32. In other words, the gate insulating layer 18 and the passivation layer 32 both commonly have the second contact hole C2, as shown in FIG. 3D.

Next, as shown in FIGS. 2E, 3E and 4E, a pixel electrode 34, a gate pad terminal 36 and a data pad terminal 38 are formed by depositing and patterning transparent conductive materials, such as indium tin zinc oxide (ITZO) on the entire surface of the passivation layer 32. At this time, the pixel electrode 34 connects to the drain electrode 26 via the first contact hole C1, and the gate pad terminal 36 and the data pad terminal 38 are connected to the gate and data pads 16 and 30 via the second and third contact holes C2 and C3, respectively. For convenience, the pixel electrode 34, the gate pad terminal 36 and the data pad terminal 38 will subsequently be collectively referred to as a pixel pattern 33. The fifth metal layer 23c of the data pattern 23 in FIGS. 2C, 3C and 4C functions as the barrier layer for the fourth metal layer 23b of the data pattern 23 in FIGS. 2C, 3C and 4C and the pixel pattern 33.

When the electrodes and the lines are formed of low resistance metallic materials, signal speed improves. A barrier layer can prevent a reduction in resistance value caused by being oxidization of the low resistance metallic material. In addition, a barrier layer prevents contact defects during the process of patterning the low resistance metal layer. Moreover, when the low resistance metallic material is used in the data pattern, such as the source electrode, the drain electrode, the data line and the data pad, the data pattern should further include upper and lower barrier layers as well as the low resistance metal layer. Therefore, the process time and cost increase for fabricating an LCD device according to the related art.

SUMMARY OF THE INVENTION

Accordingly, the present invention is directed to a liquid crystal display (LCD) device and a fabrication method thereof that substantially obviates one or more of problems due to limitations and disadvantages of the related art.

An object of the present invention is to provide a low resistance metallic pattern or electrodes for a liquid crystal display device without contact defects.

Another object of the present invention is to provide a simple fabricating method of an array substrate for a liquid crystal display device using a low resistance metallic material.

Another object of the present invention is to reduce the number of processes of forming one of gate pattern and data pattern using a low metallic material with a barrier metallic material for the low metallic material.

Another object of the present invention is to provide a liquid crystal display device having high quality and large size.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a gate pattern on a substrate, the gate pattern including a gate electrode and a gate line, a gate insulating layer on the gate pattern, a semiconductor layer on the gate insulating layer, a data pattern over the semiconductor layer, the data pattern including source and drain electrodes, and a data line, a passivation layer on the data pattern; and a pixel electrode connected to the drain electrode and located on the passivation layer, wherein at least one of the gate pattern and the data pattern includes a first metal layer of molybdenum (Mo)-titanium (Ti) alloy and a second metal layer of one of copper (Cu), aluminum (Al), silver (Ag) and gold (Au) on the first metal layer.

In another aspect of the present invention, a fabricating method of an array substrate for a liquid crystal display device includes forming a gate pattern on a substrate, the gate pattern including a gate electrode and a gate line, forming a gate insulating layer on the gate pattern, forming a semiconductor layer on the gate insulating layer, forming a data pattern over the semiconductor layer, the data pattern including source and drain electrodes and a data line, forming a passivation layer on the data pattern, and forming a pixel electrode connected to the drain electrode and being located on the passivation layer, wherein the step of forming at least one of the gate pattern and the data pattern includes forming a first metal layer including molybdenum (Mo)-titanium (Ti) alloy and forming a second metal layer including one of copper (Cu), aluminum (Al), silver (Ag) and gold (Au) on the first metal layer.

Yet, in another aspect of the present invention, a semiconductor device includes a substrate having source and drain regions, a gate insulating layer on the substrate, a gate electrode on the gate insulating layer, an interlayer on the gate electrode, a source electrode connected to the source region, and a drain electrode connected to the drain region, wherein at least one of the gate electrode, the source electrode and the drain electrode includes a first metal layer of molybdenum (Mo)-titanium (Ti) alloy, a second metal layer of one of metallic metals including copper (Cu), aluminum (Al), silver (Ag) and gold (Au) on the first metal layer.

In a further aspect of the present invention, a fabricating method of a semiconductor device includes: forming a gate electrode on a substrate; forming a gate insulating layer on the gate electrode; forming a semiconductor layer on the gate insulating layer; forming source and drain electrodes on the semiconductor layer; forming a passivation layer on the source and drain electrodes; and forming a pixel electrode connected to the drain electrode and being located on the passivation layer, wherein the step of forming at least one of the gate electrode, the source electrode and the drain electrode includes forming a first metal layer including molybdenum (Mo)-titanium (Ti) alloy, forming a second metal layer including one of copper (Cu), aluminum (Al), silver (Ag) and gold (Au) on the first metal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 1:
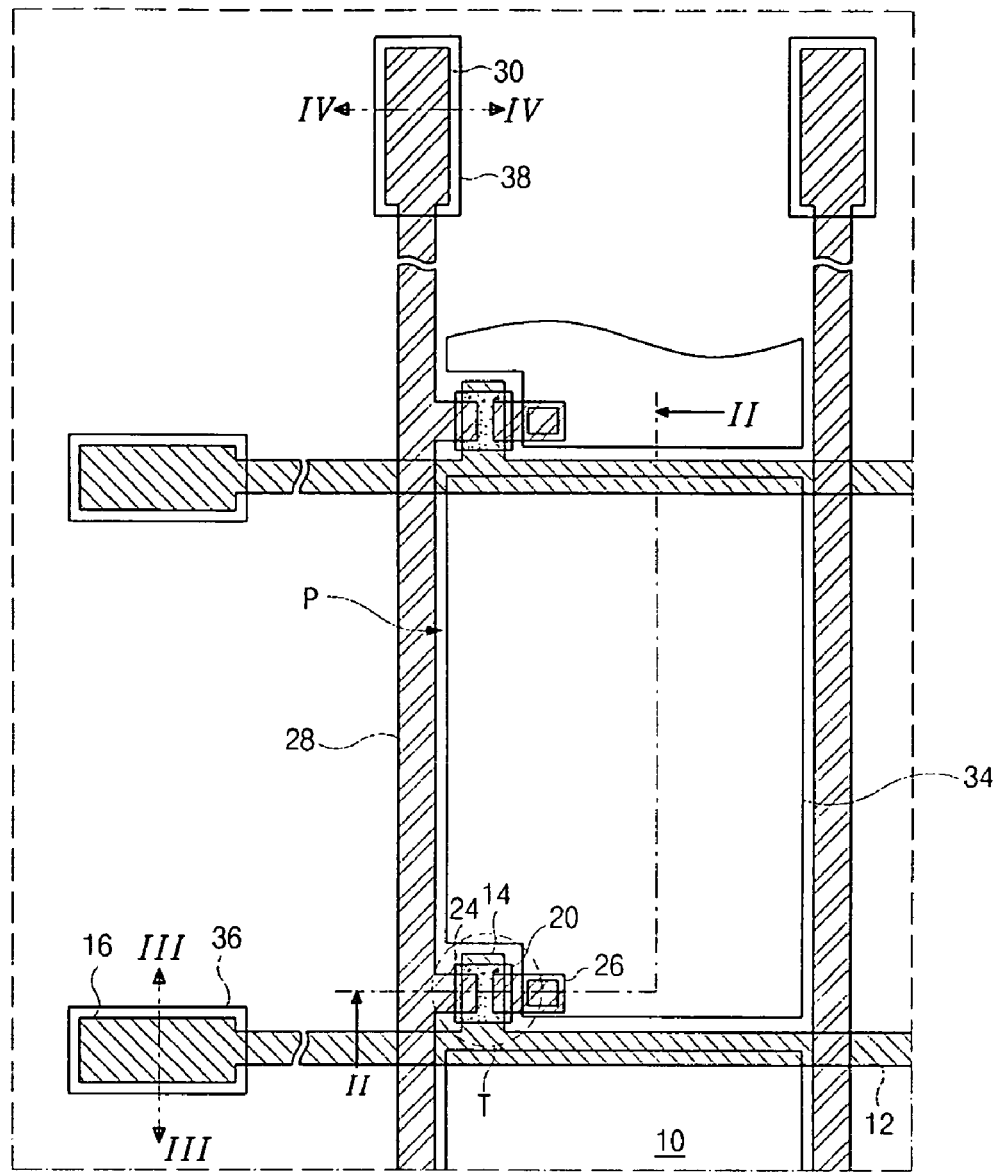
FIG. 1 is a schematic plan view showing an array substrate for a liquid crystal display device according to the related art.
Figure 2A:
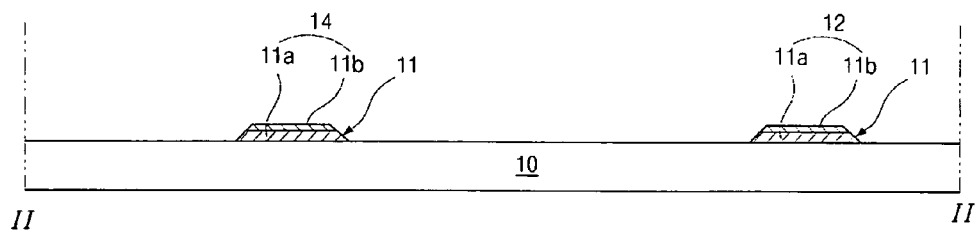
FIGS. 2A to 2E, 3A to 3E and 4A to 4E are schematic cross-sectional views taken along lines II-II, III-III and IV-IV in FIG. 1 that show the fabricating process of an array substrate for a liquid crystal display device.
Figure 2B:
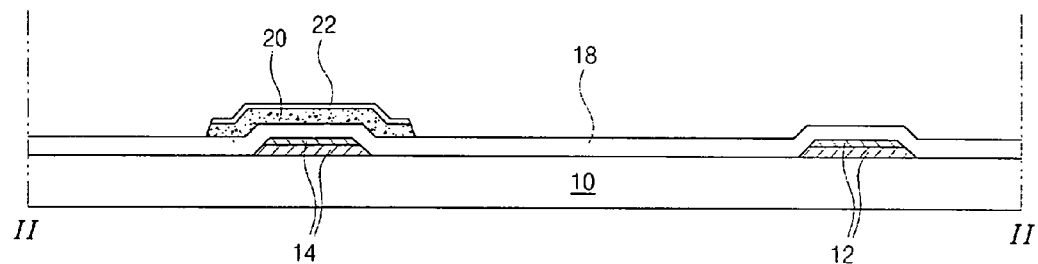
Figure 2C:
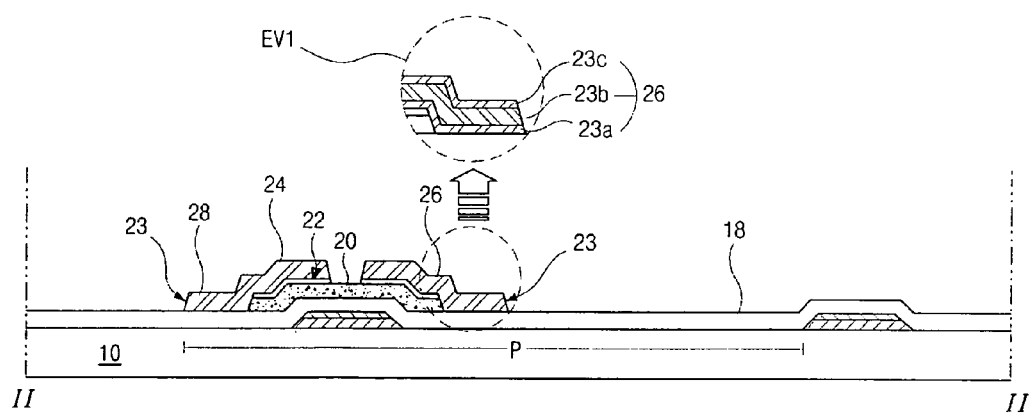
Figure 2D:
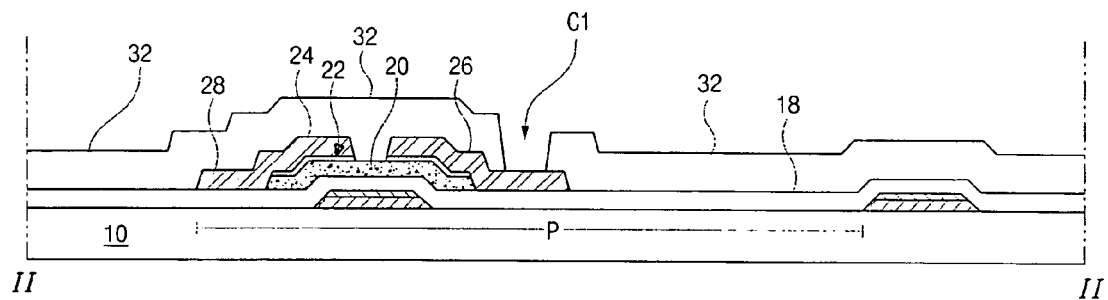
Figure 2E:
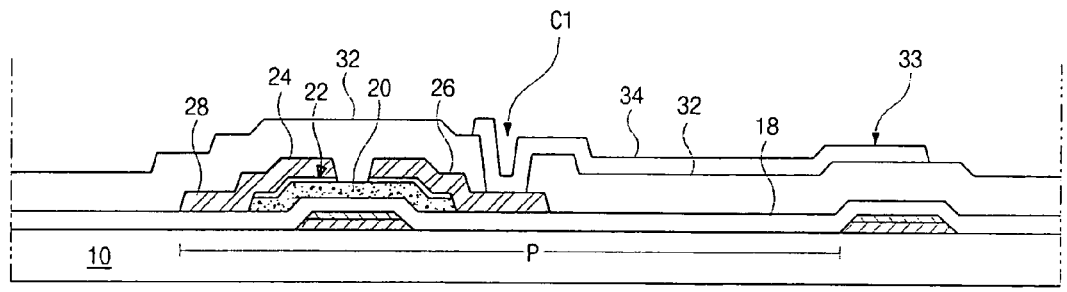
Figure 3A:
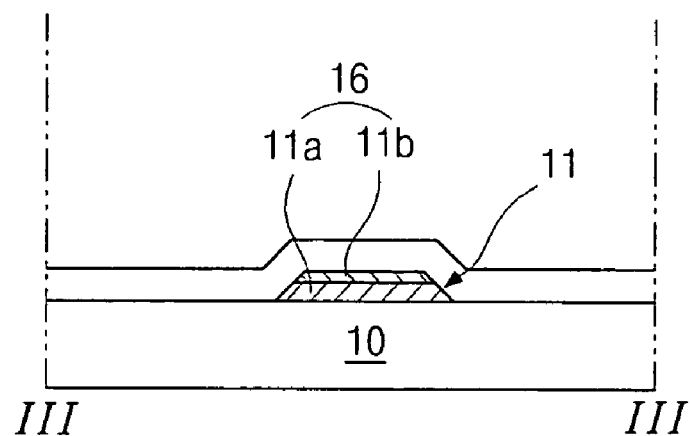
Figure 3B:
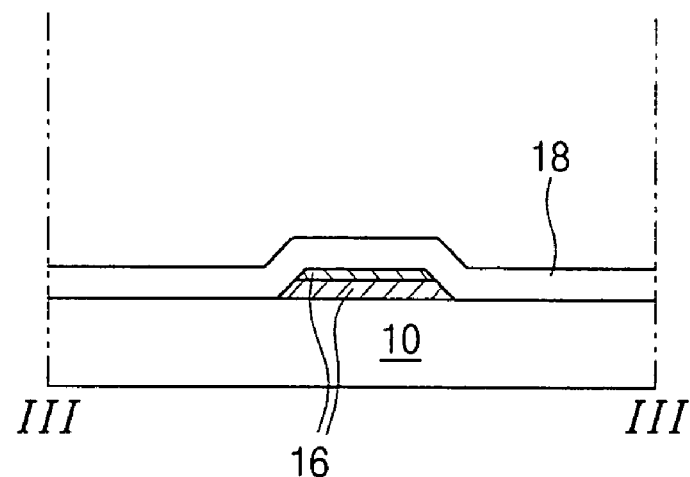
Figure 3C:
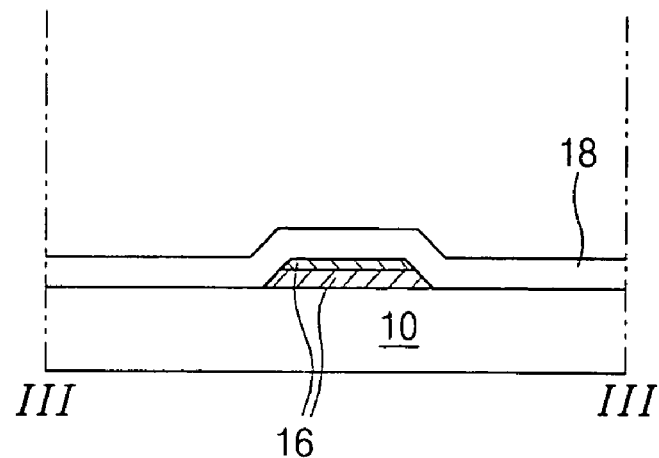
Figure 3D:
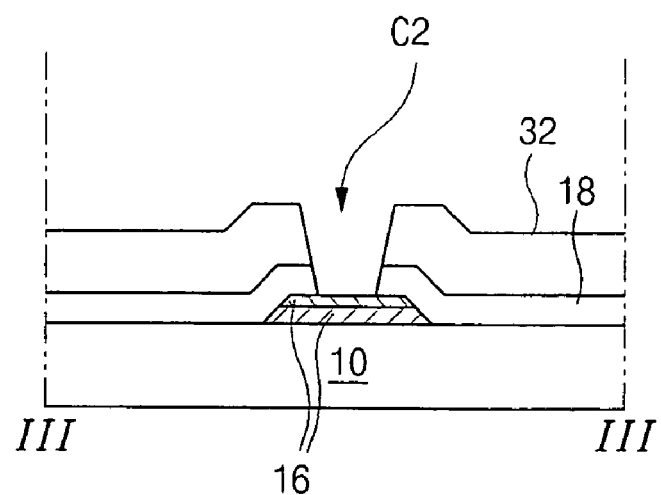
Figure 3E:
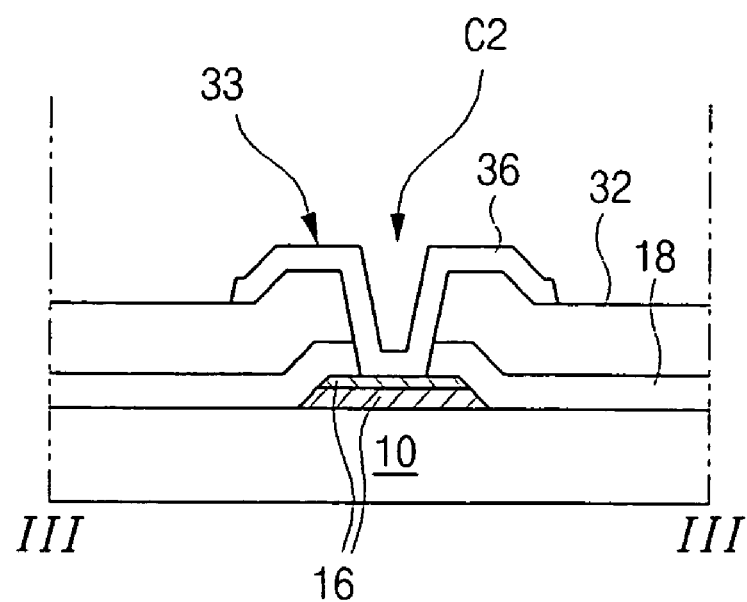
Figure 4A:
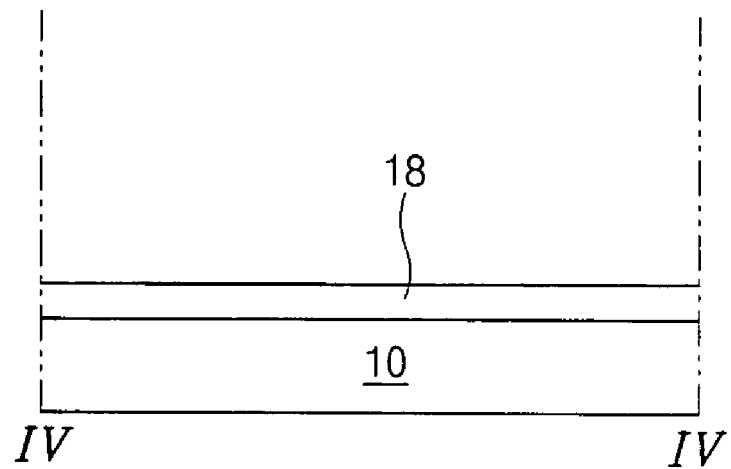
Figure 4B:
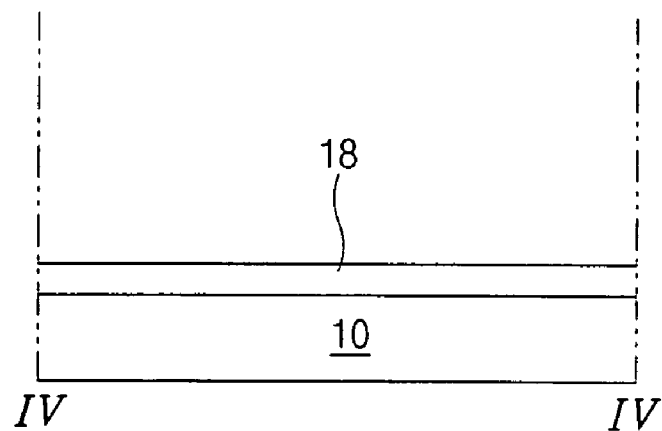
Figure 4C:
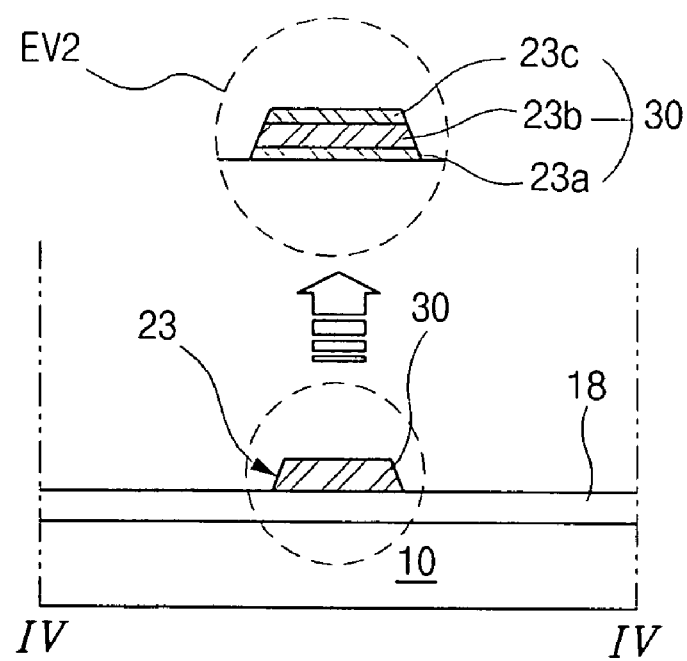
Figure 4D:
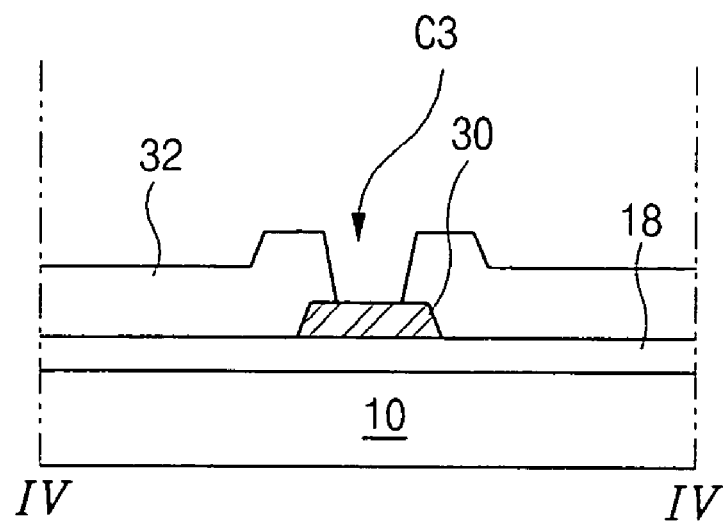
Figure 4E:
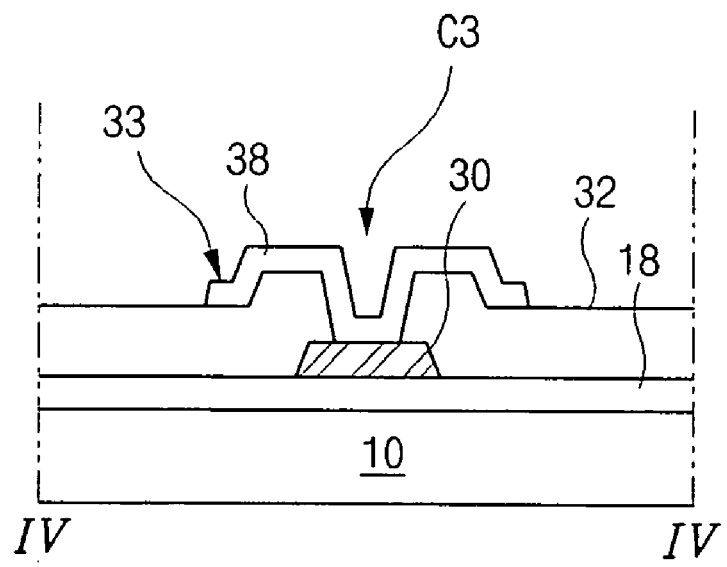
Figure 5:
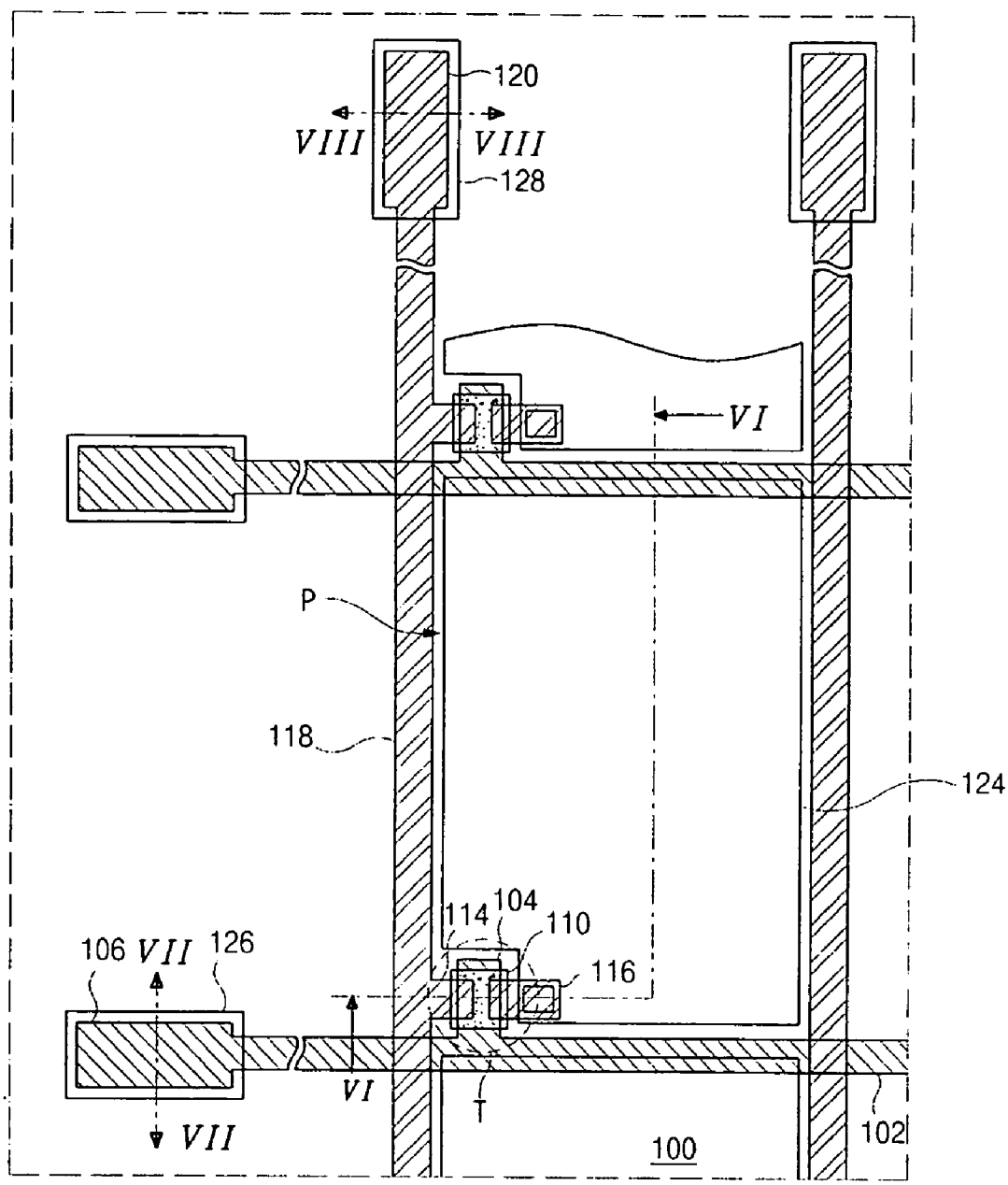
FIG. 5 is a schematic plan view showing an exemplary array substrate for a liquid crystal display device according to an embodiment of the present invention.

FIG. 5 is a schematic plan view showing an exemplary array substrate for a liquid crystal display device according to an embodiment of the present invention. As shown in FIG. 5, thin film transistors (TFTs) T in matrix are formed on a substrate 100, referred to as an array substrate. The TFTs T are switching devices. Each TFT T includes a gate electrode 104, an active layer 110 over the gate electrode 104, and source and drain electrodes 114 and 116. Moreover, each TFT T is connected to a gate line 102 and a data line 118. A pixel region P is defined between the gate line 102 and the data line 118. A pixel electrode 124 is formed in the pixel region P and connected to the thin film transistor T.

A gate pad 106 is formed at one end of the gate line 102 and a data pad 120 is formed at one end of the data line 118. The gate pad 106 is wider than the gate line 102 and the data pad 120 is wider than the data line 118. Specifically, because signals of an external circuit are applied to the gate and data lines 102 and 118 through the gate and data pads 106 and 120, the gate and data pads 106 and 120 should be formed wider than the gate and data lines 102 and 118 to lower resistance of the gate and data pads 106 and 120, respectively. A gate pad terminal 126 and a data pad terminal 128, which receive external signals, are formed over the substrate 100 having the gate pads 106 and data pads 120 and are connected to the gate and data pads 106 and 120, respectively. For example, the gate and data pad terminals 126 and 128 can be formed of transparent conductive materials, such as indium tin zinc oxide (ITO), indium zinc oxide (IZO) and indium tin zinc oxide (ITZO).

Although not shown, the gate electrode 104, the gate line 102 and the gate pad 106 can be a gate pattern having a double metal layer structure. Such a double metal layer structure includes a bottom metal layer as a first barrier layer and a top metal layer as a gate metal layer. The top metal layer is formed of low resistance metallic materials such as copper (Cu), Al, silver (Ag) and gold (Au). The bottom metal layer is formed of MoTi alloy having good adhesion and contact properties with low metallic materials. Additionally, the double metal layer can be used to form a diffusion layer, which is formed by annealing the double metal layer to create a Ti layer from the Ti in the MoTi bottom metal layer. The diffusion layer maintains the good adhesion and contact properties of the bottom metal while also keeping the low resistance of the top metal layer.

The gate electrode 104, the gate line 102 and the gate pad 106 can be formed of low resistance metallic materials, such as copper (Cu), Al, silver (Ag), and gold (Au). The gate electrode 104, the gate line 102 and the gate pad 106 are referred to as a gate pattern (not shown), and the source electrode and drain electrode, the data line and the data pad are referred to as a data pattern (not shown). At least one of the gate pattern and the data pattern includes a low resistance metallic material to prevent signal delay and a barrier metal layer of MoTi alloy.

FIGS. 6A to 6H, 7A to 7H and 8A to 8H are schematic cross-sectional views taken along lines VI-VI, VII-VII and VIII-VIII of FIG. 5 and show a fabricating process of an array substrate for a LCD device. FIGS. 6A to 6H show one pixel region including a thin film transistor. FIGS. 7A to 7H show an area of a gate pad, and FIGS. 8A to 8H show the area of a data pad.

Figure 6A:
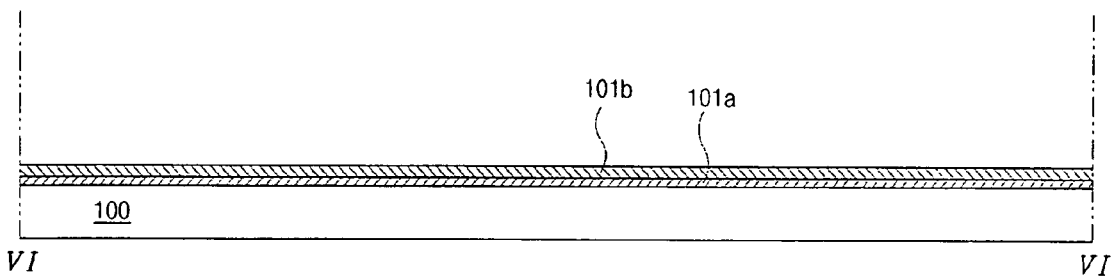
FIGS. 6A to 6H, 7A to 7H and 8A to 8H are schematic cross-sectional views taken along lines VI-VI, VII-VII and VIII-VIII of FIG. 5 and shows a fabricating process of an array substrate for a LCD device.
Figure 7A:
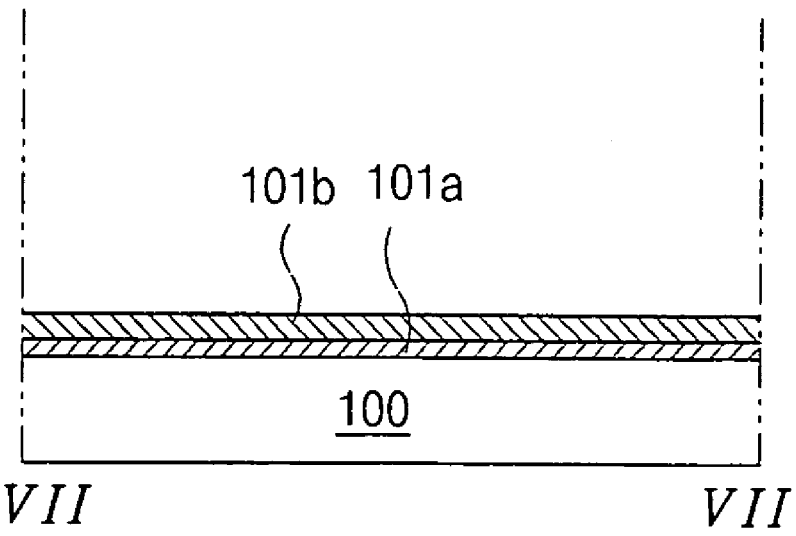
Figure 8A:
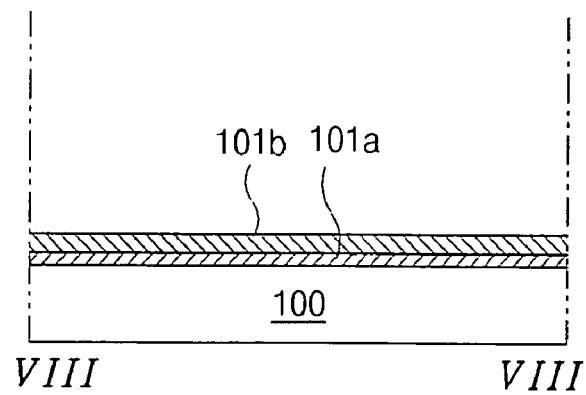

In FIGS. 6A, 7A and 8A, a first metal layer 101a is formed of molybdenum(Mo)-titanium (Ti) alloy. The first metal layer 101a is formed over an entire surface of a substrate 100. A second metal layer 101b is formed of a low resistance metallic material, such as copper (Cu), Al, silver (Ag) and gold (Au). The second metal layer 101b is formed over the entire surface of the first metal layer 101a on the substrate 100. Specifically, the first metal layer 101a can be deposited by using MoTi alloy targets and the second metal layer 101b can be deposited by using low resistance metal targets.

Figure 6B:
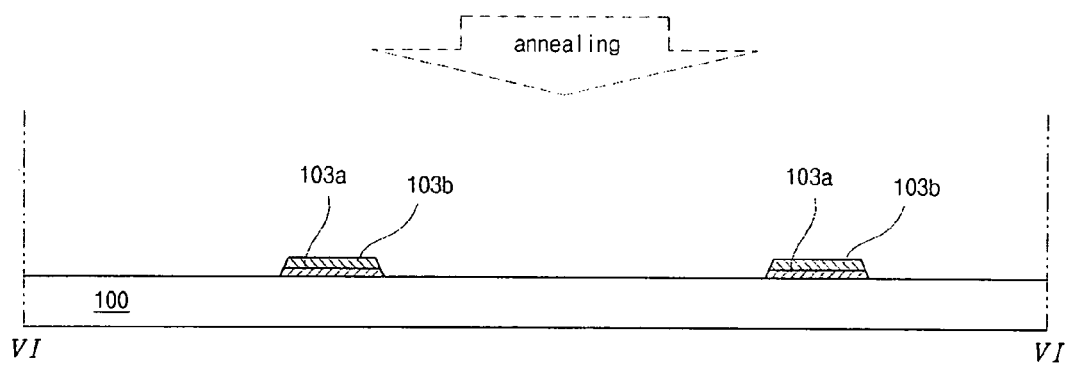
Figure 7B:
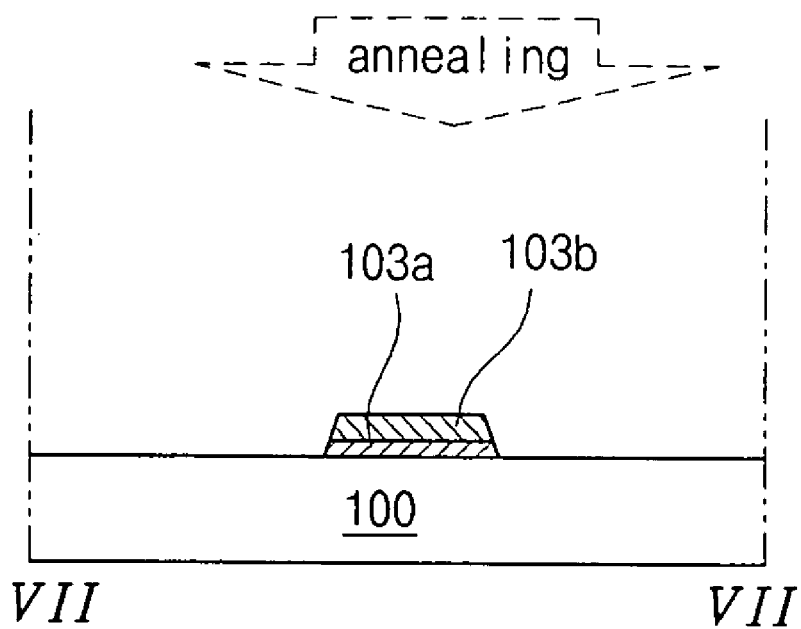
Figure 8B:
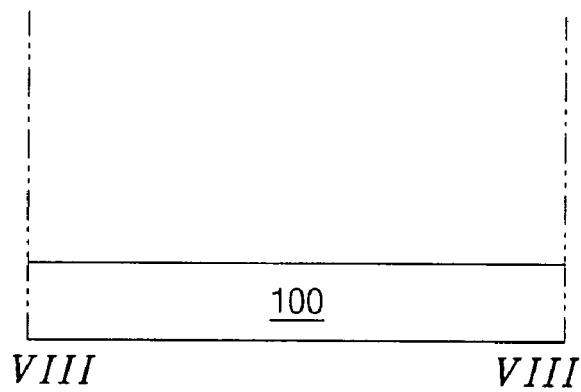

In FIGS. 6B, 7B and 8B, the first and second metal layers 101a and 101b (of FIGS. 6A, 7A and 8A) are patterned into a first barrier layer 103a and a gate metal layer 103b, respectively. At this time, the first barrier layer 103a and the gate metal layer 103b are formed with the same patterning process. Therefore, the first barrier layer 103a and the gate metal layer 103b the same.

Next, a step of annealing the substrate 100 having the gate line 102, the gate electrode 104 and the gate pad 106 is performed at temperature within a range of about 300 degrees Celsius to about 400 degrees Celsius. The step of annealing is not necessarily an additional step and it may correspond to the pre-step of forming gate insulating layer that will be subsequently formed.

Figure 6C:
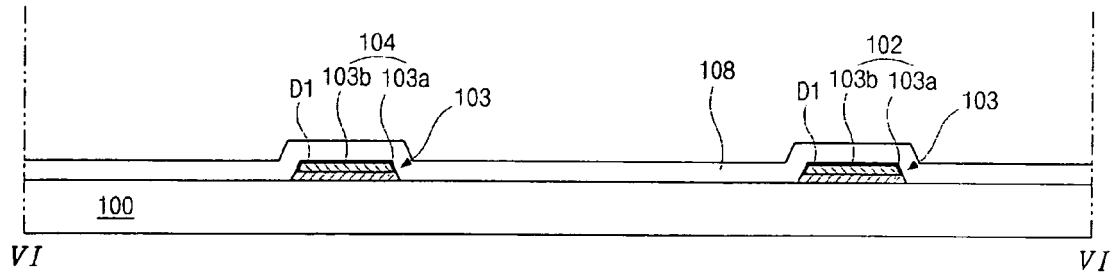
Figure 7C:
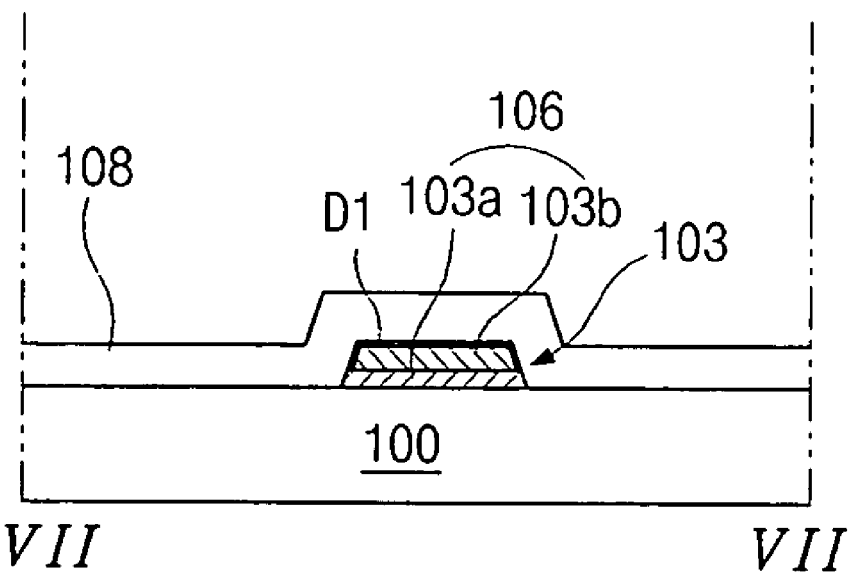
Figure 8C:
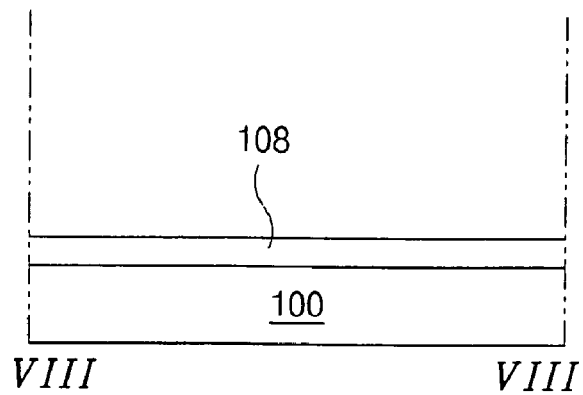

In FIGS. 6C, 7C and 8C, after the step of annealing, a first diffusion layer D1 is formed over the entire surface of the gate metal layer 103b. At this time, the first diffusion layer D1 has a relatively thin thickness. The first barrier layer 103a improves contact with the substrate 100. The first diffusion layer D1 prevents oxidation of the gate metal layer 103b due to exposure and damage to the gate metal layer 103b by an etchant during the step of patterning the gate pattern 103.

In other words, a gate line 102, a gate electrode 104 and a gate pad 106 are formed as a double metal layer structure including the first barrier layer 103a and the gate metal layer 103b. Each of the gate line 102, the gate electrode 104 and the gate pad 106 is referred to as the gate pattern 103. The gate pattern 103 further includes the first diffusion layer D1 that is formed by diffusing a dopant from the first barrier layer 103a, such as Ti, into the top surface of the gate metal layer 103b. The gate line 102 is formed along a first direction, and the gate electrode 104 extends from the gate line 102. The gate pad 106 is formed at an end portion of the gate line 102 and is wider than the gate line 102, as shown in FIG. 5.

Figure 6D:
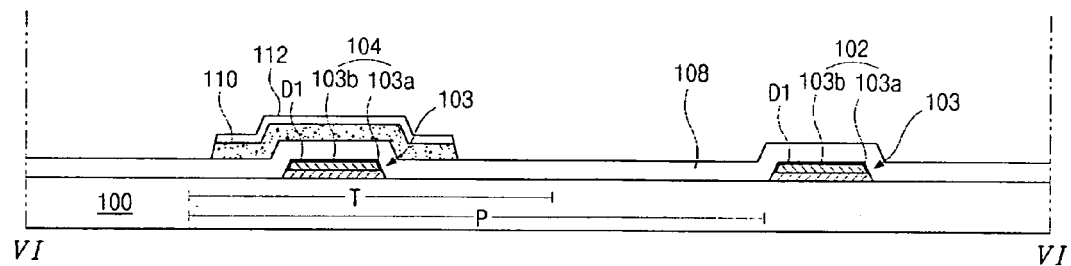
Figure 7D:
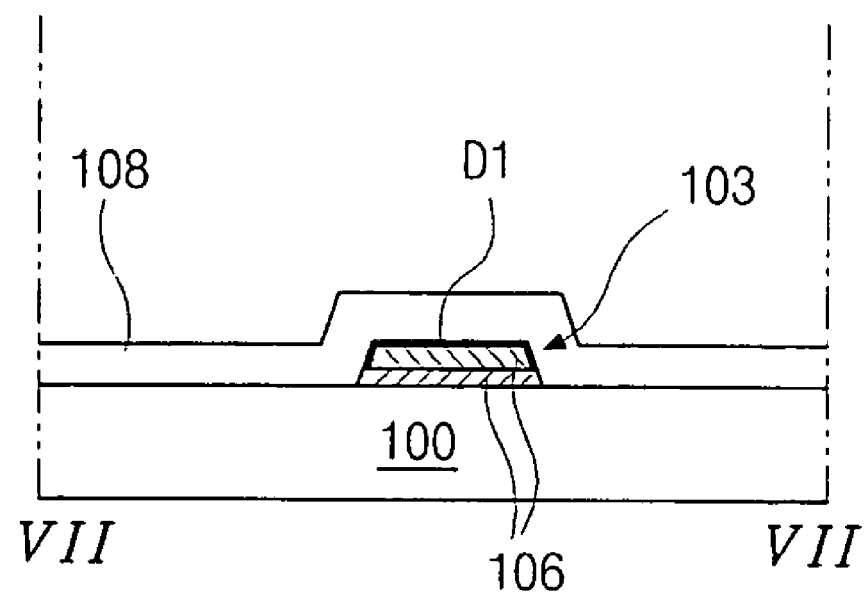
Figure 8D:
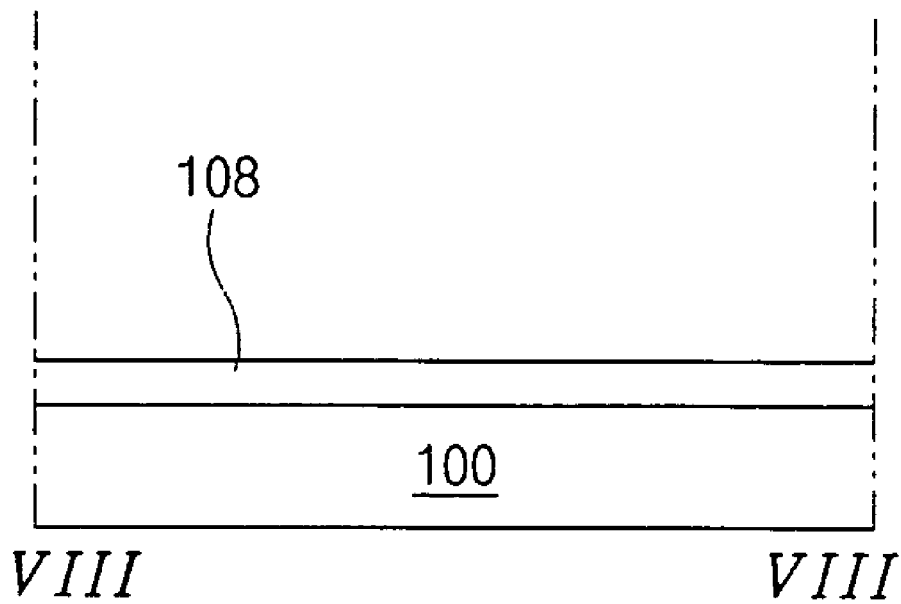

A gate insulating layer 108 is then formed over the entire surface of the substrate 100 having the gate pattern 103. For example, the gate insulating layer 108 is an inorganic material, such as silicon nitride (SiNx) and silicon oxide (SiOx). Next, an active layer 110 and an ohmic contact layer 112 are sequentially formed as island patterns on the gate insulating layer 108 over the substrate 100, as shown in FIGS. 6D, 7D and 8D. For example, the active layer 110 and the ohmic contact layer 112 are formed by depositing and patterning an intrinsic amorphous silicon layer and an impurity-doped amorphous silicon, respectively.

Figure 6E:
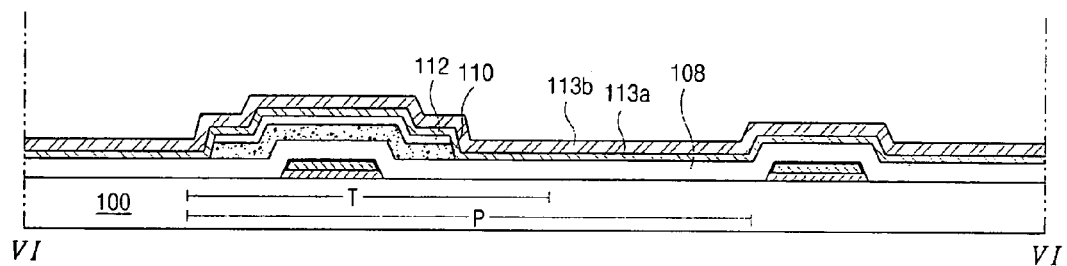
Figure 7E:
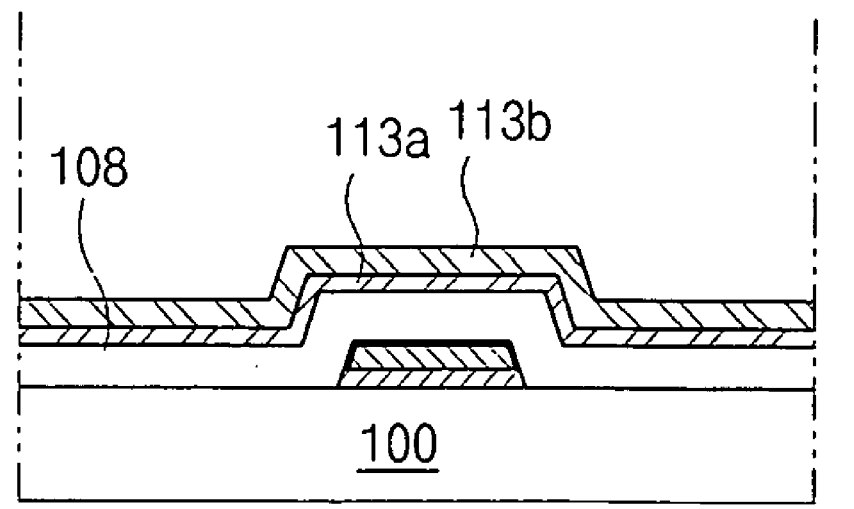
Figure 8E:
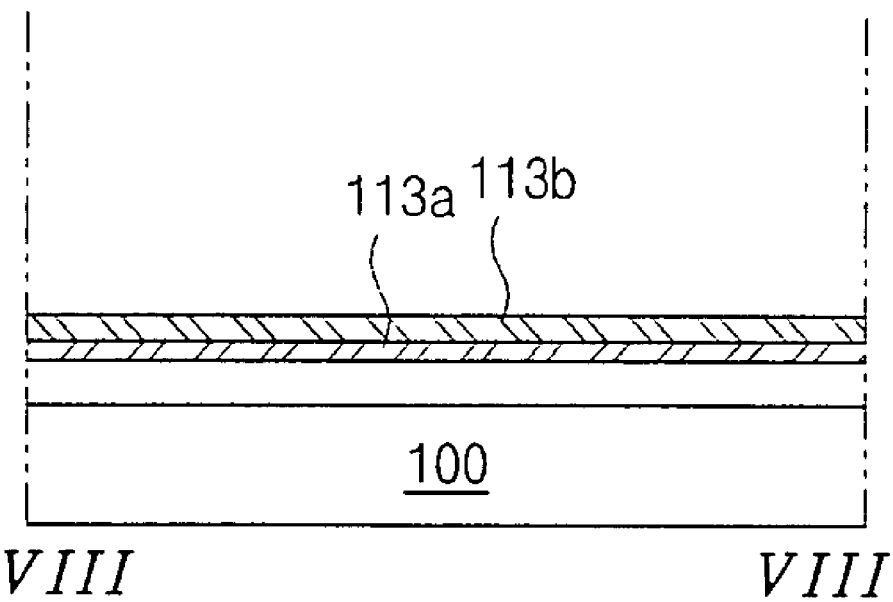

Next, in FIGS. 6E, 7E and 8E, a third metal layer 113a of an Mo Ti alloy is formed over the entire surface of the ohmic contact layer 112, and a fourth metal layer 113b is formed of a low resistance metallic material. For example, the fourth metal layer 113b can be the same material as the second metal layer 101b of FIGS. 6A, 7A and 8A.

Figure 6F:
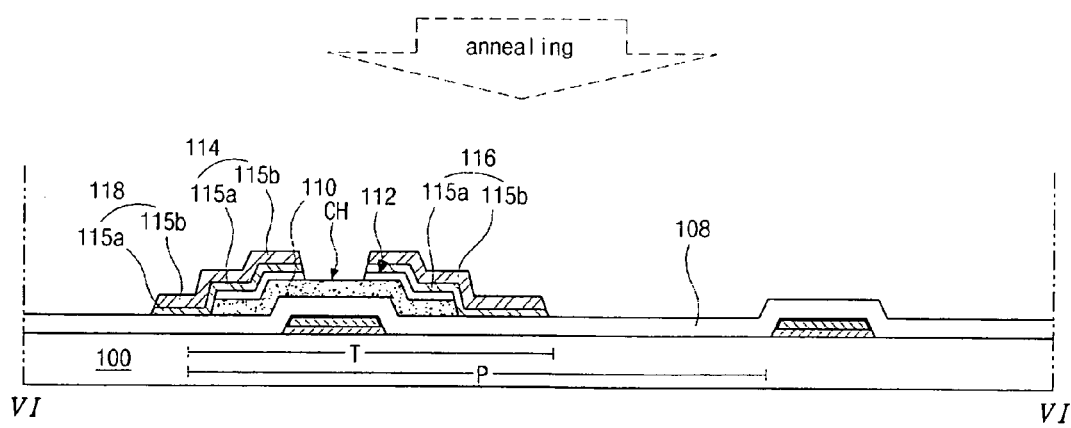
Figure 6G:
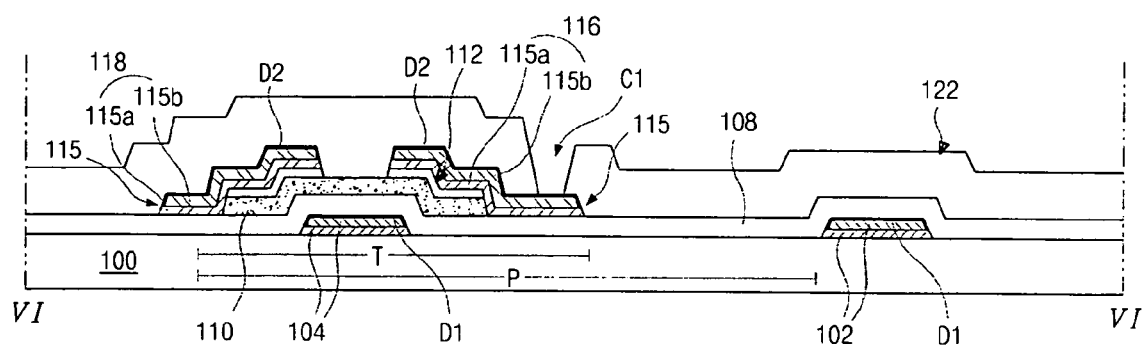
Figure 7F:
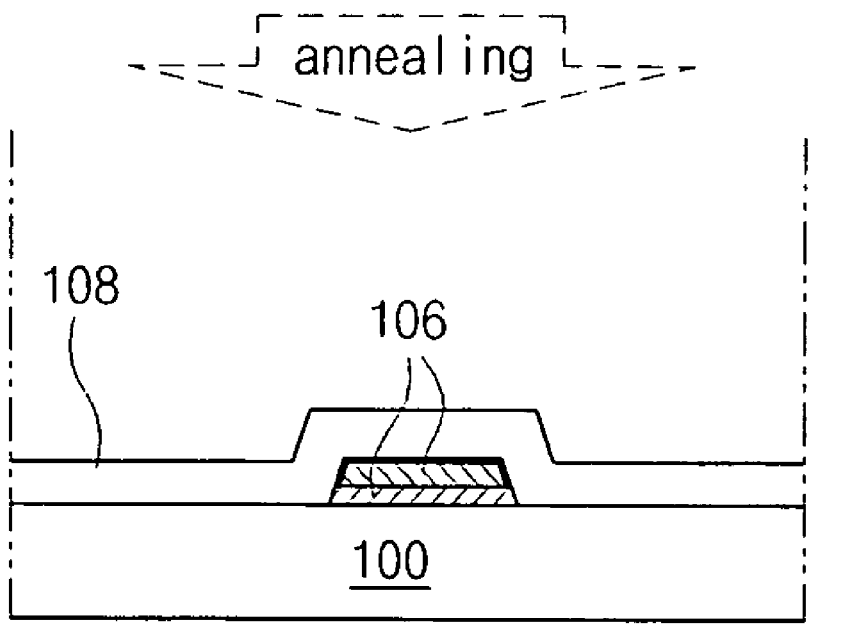
Figure 8F:
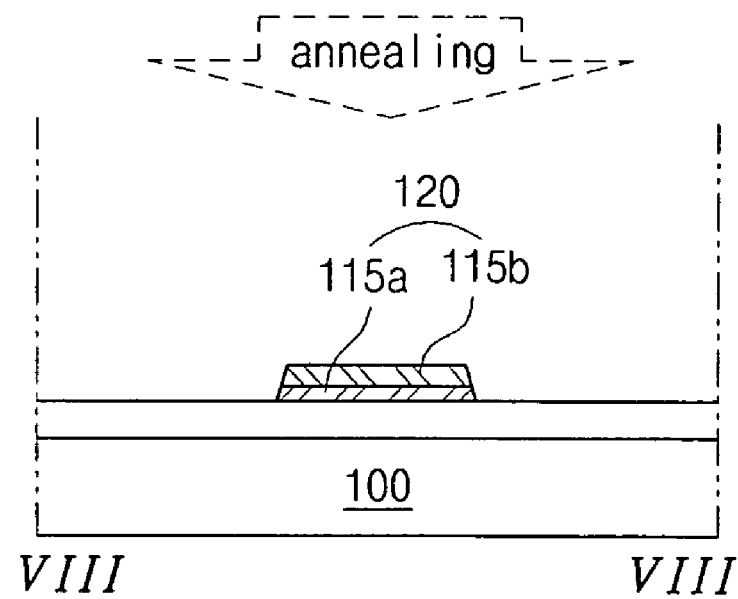

In FIGS. 6F, 7F and 8F, the third and fourth metal layers 113a and 113b of FIGS. 6E, 7E and 8E are patterned into a second barrier layer 115a and a data metal layer 115b, respectively. The second barrier layer 115a and the data metal layer 115b are the same. The second barrier layer 115a and the data metal layer 115b include a data line 118, a source electrode 114, a drain electrode 116 and a data pad 120. Although not shown, the data line 118 is formed along a second direction crossing the first direction, the source electrode 114 extends from the data line 118, and the drain electrode 116 is spaced apart from the source electrode 114. The data pad 120 is located in an end portion of the data line 118 and is wider than the data line 118 as shown in FIG. 5.

Next, a portion of the active layer 110 is exposed by removing a portion of the ohmic contact layer 112 between the source and drain electrodes 114 and 116. A channel region CH is defined by exposing a portion of the active layer 110. In addition, another step of annealing the substrate 100 having the data line 118, the source and drain electrodes 114 and 116 and the data pad 120 is then performed at temperature within a range of about 300 degrees Celsius to about 400 degrees Celsius.

Figure 7G:
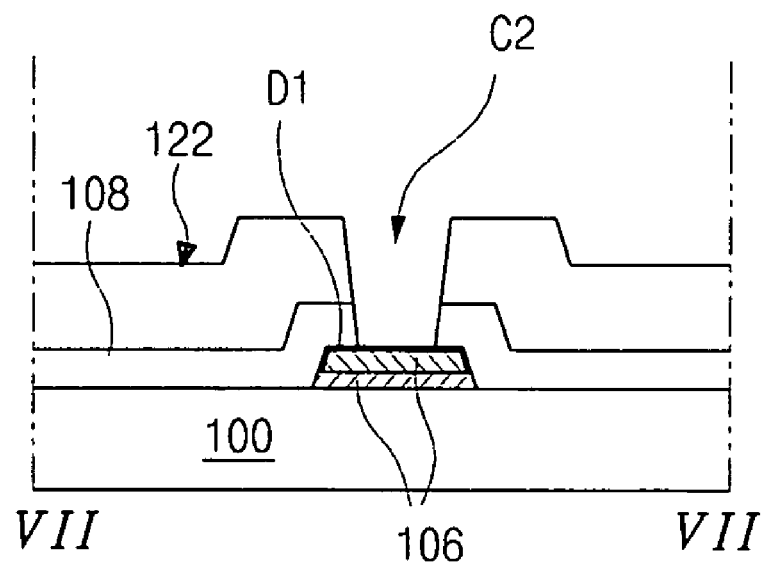
Figure 8G:
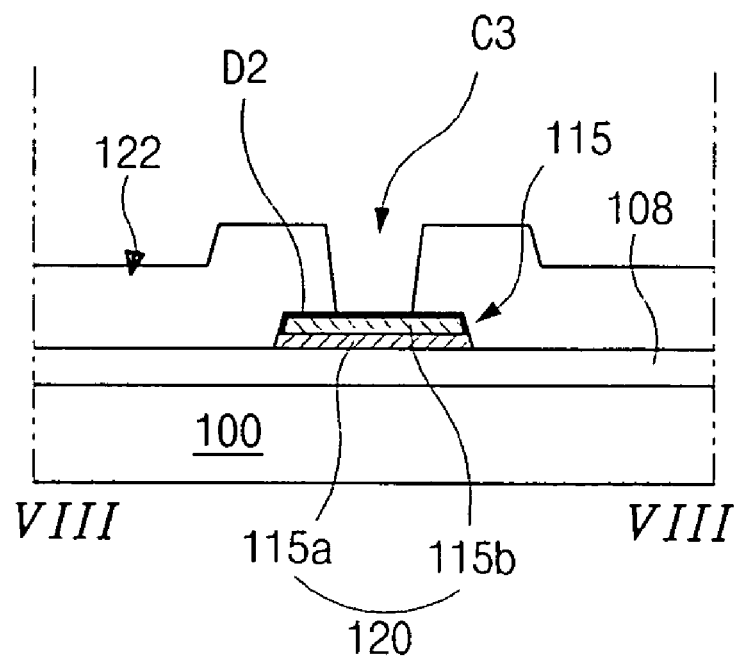

In FIGS. 6Q, 7G and 8G, through the step of annealing, a second diffusion layer D2 is formed over the entire surface of the data metal layer 115b. Specifically, the second diffusion layer D2 is formed by diffusing a dopant into the data metal layer 115b from the second barrier layer 115a. The second diffusion layer D2 is formed with a relatively thin thickness. More specifically, the second diffusion layer D2 covers the entire surface of the data metal layer 115b, thereby improving the contact property of the source and drain electrodes 114 and 116, the data line 118 and the data pad 120. The source and drain electrodes 114 and 116, the data line 118 and the data pad 120 have a double metal layer. The source electrode 114, drain electrode 116, the data line 118 and the data pad 120 are referred to as a data pattern 115 for convenience. The data pattern 115 further includes a second diffusion layer D2 that covers the entire surface of the data metal layer 115b.

The portion of the second barrier layer 115a corresponding to the source electrode 114 and drain electrode prevents a contact defect between the ohmic contact layer 112 and the data metal layer 115b. The other portion of the second barrier layer 115a corresponding to the data line 118 and the data pad 120 prevents a contact defect between the data metal layer 115b and the gate insulating layer 108. Moreover, because the first and second diffusion layers D1 and D2 of the gate and data pads 106 and 120 prevent oxidation of the gate and data pads 106 and 120, contact resistance of the gate and data pads 106 and 120 to the gate and data pad terminals is lowered.

Next, a passivation layer 122 is formed over the entire surface of the substrate 100 having the data line 118, the source electrode 114, drain electrode 116 and the data pad 120. For example, the passivation layer 122 can be inorganic materials, such as SiNx and SiOx, or organic materials, such as benzocyclobutene (BCB) and acrylic resin. Additionally, a first contact hole C1 exposing a portion of the drain electrode 116, a second contact hole C2 exposing a portion of the gate pad 106, and a third contact hole C3 that exposing a portion of the data pad 120 are formed in the passivation layer 122. Among them, the second contact hole C2 is also formed in the gate insulating layer 108 as well as the passivation layer 122. In other words, the second contact hole C2 is formed on both the gate insulating layer 108 and the passivation layer 122.

Figure 6H:
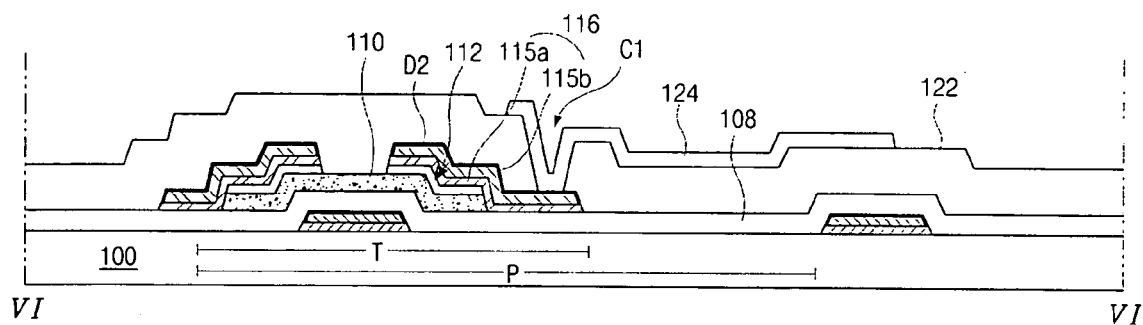
Figure 7H:
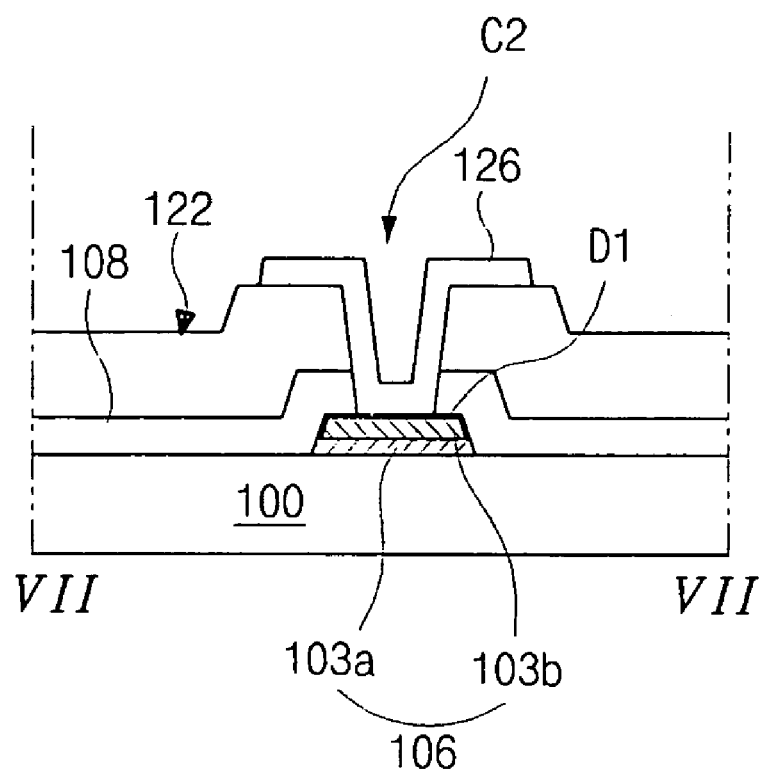
Figure 8H:
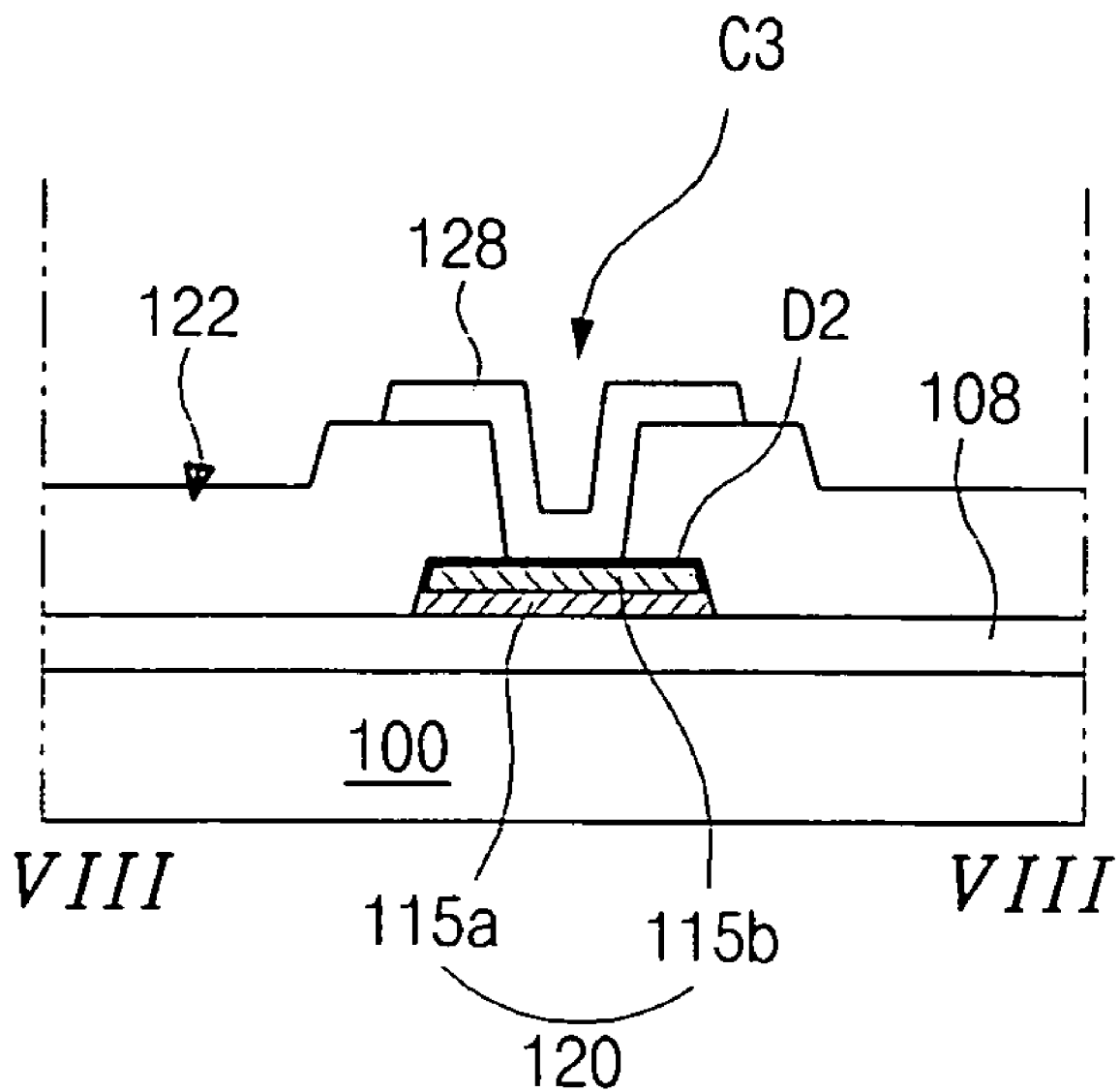
Figure 9A:
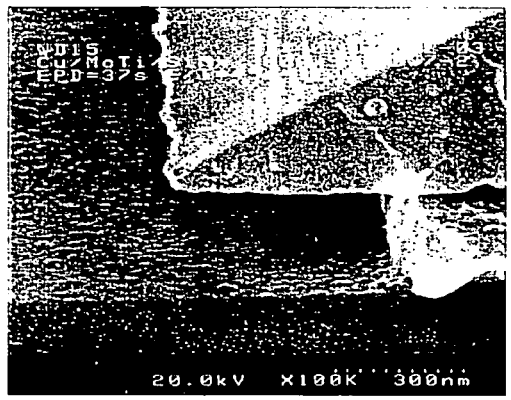
FIGS. 9A to 9D, 10A and 10B, and 11A and 11B are views showing scanning electron microscopy (SEM) of a double metal layer including MoTi alloy layer as a bottom metal layer and copper (Cu) layer as a top metal layer.
Figure 9B:
Figure 9C:
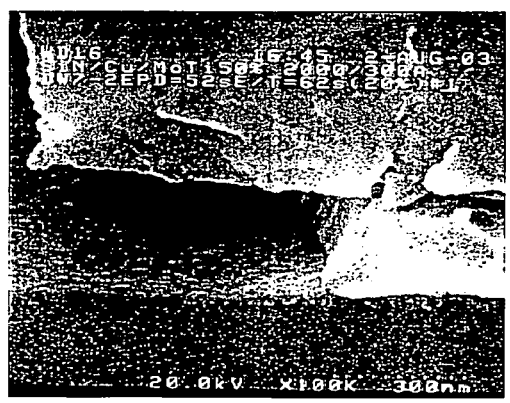
Figure 9D:

Next, as shown in FIGS. 6H, 7H and 8H, a pixel electrode 124, a gate pad terminal 126 and a data pad terminal 128 are formed using transparent conductive materials, such as indium tin zinc oxide (ITO), indium zinc oxide (IZO) and indium tin zinc oxide (ITZO). At this time, the pixel electrode 124 is connected to the drain electrode 116 via the first contact hole C1, the gate and data pad terminals 126 and 128 are connected to the gate and data pads 106 and 120 via the second and third contact holes C2 and C3, respectively. The contact between the gate pad 106 and the gate pad terminal 126, and the gate pad 106 and the gate pad terminal 126 can be improved by forming the first and second diffusion layers D1 and D2 therebetween, respectively.

Figure 10A:
Figure 10B:
Figure 11A:
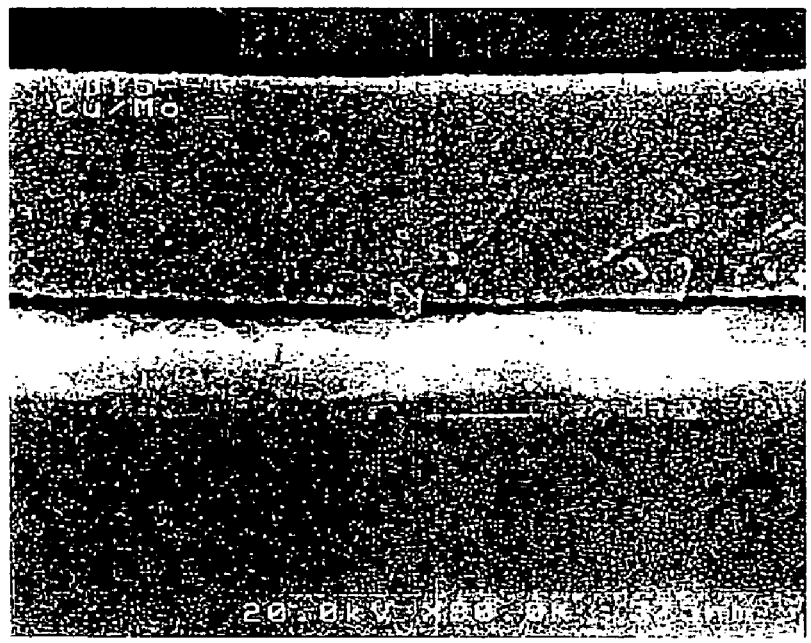
Figure 11B:
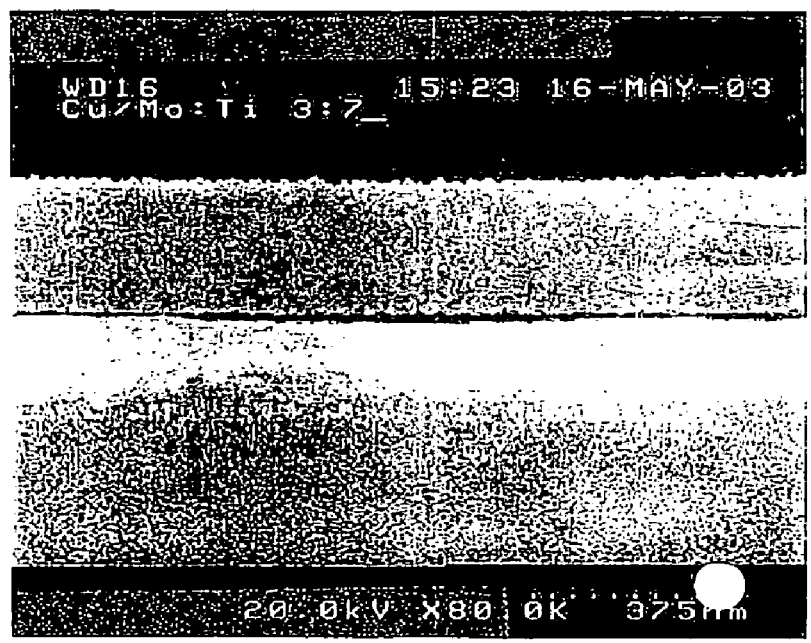

FIGS. 9A to 9D, 10A and 10B, and 11A and 11B are views showing scanning electron microscopy (SEM) pictures of a double metal layer having a MoTi alloy layer as a bottom metal layer and a copper (Cu) layer as a top metal layer. FIGS. 9A to 9D are SEM pictures for the MoTi alloy layer having a Ti content of about 10%, 30%, 50%, and 70% by atomic weight, respectively. FIGS. 10A and 10B are SEM pictures for the MoTi alloy layer having a Ti content of about 30% and 50% by atomic weight, respectively. Also, FIGS. 11A and 11B are SEM pictures for the MoTi alloy layer having a Ti content of about 30% and 50% by atomic weight, respectively.

In FIGS. 9A to 9D, a double metal layer corresponds to a MoTi alloy layer as a barrier layer and Cu layer as a low resistance metal layer on the MoTi alloy. Thus, the double metal layer may permit an etching margin for an applied etchant. Therefore, a residual portion of the barrier metal layer may be removed. More specifically, when Ti content of the MoTi alloy is within a range of about 10% to 70% by atomic weight, the barrier metal layer may be removed as shown in FIGS. 9A to 9D. When a Ti content of MoTi alloy is more than 30% by atomic weight, under-cut phenomenon between the MoTi alloy and the Cu layer can be minimized as shown in FIGS. 10A and 10B.

Although not shown, Ti content of the MoTi alloy can extend to a range of about 10% to 90% by atomic weight in order to obtain these advantages.

When the Cu layer of a gate pattern directly contacts a gate insulating layer, such as silicon nitride (SiNx), a spiking phenomenon of the gate insulating layer occurs, as shown in FIG. 11A. However, when the Cu layer has the MoTi alloy as a barrier metal layer, the spiking phenomenon can be prevented, as shown in FIG. 11B. Consequently, when a MoTi alloy is used as a buffer metal layer for a low resistance metal layer according to an embodiment of the present invention, the spiking phenomenon disappears, contact properties of the Cu line for the gate pattern or the data pattern can be improved in comparison with Mo or Cr as a single barrier metal layer.

By first forming the MoTi alloy as a barrier layer underneath the low resistance metal layer, contact property of the low resistance metal layer can be improved. Because Ti dopants are diffused into the entire surface of the low resistance metal layer, oxidation of the surface of the low resistance metal layer can be prevented. Therefore, contact resistance between the low resistance metal layer and the transparent electrode, such as the pixel electrode and the gate and data pad terminals can be lowered.

According an embodiment of the present invention, because production yield and device characteristics of LCD are improved, high image quality can be obtained. Moreover, by using the MoTi alloy as a barrier layer, the low resistance metal layer can be used without problems. Consequently, because the low resistance metal is usefully applied to a liquid crystal display device, a liquid crystal display device having a large size and a high definition can be obtained with a high production yield.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a gate pattern on a substrate, the gate pattern including a gate electrode and a gate line;
   a gate insulating layer on the gate pattern;
   a semiconductor layer on the gate insulating layer;
   a data pattern over the semiconductor layer, the data pattern including source and drain electrodes, and a data line;
   a passivation layer on the data pattern; and
   a pixel electrode connected to the drain electrode and located on the passivation layer,
   wherein at least one of the gate pattern and the data pattern includes a first metal layer of molybdenum (Mo)-titanium (Ti) alloy and a second metal layer of one of copper (Cu), aluminum (Al), silver (Ag) and gold (Au) on the first metal layer, wherein the second metal layer is substantially covered by a diffusion layer which has Ti of the first metal layer.

2. The substrate according to claim 1, wherein the first metal layer acts as a barrier layer for the second metal layer.

3. The substrate according to claim 1, wherein the pixel electrode includes a transparent conductive material.

4. The substrate array to claim 3, wherein the transparent conductive materials include one of indium tin oxide (ITO), indium zinc oxide (IZO) and indium tin zinc oxide (ITZO).

5. The substrate according to claim 1, further comprising a gate pad formed of the same material as the gate pattern.

6. The substrate according to claim 1, further comprising a data pad formed of the same material as the data pattern.

7. The substrate according to claim 1, wherein at least one of the gate insulating layer and the passivation layer includes an inorganic insulating material.

8. The substrate according to claim 7, wherein the inorganic insulating material includes one of silicon nitride (SiNx) and silicon oxide (SiO$_2$).

9. The substrate according to claim 1, wherein a Ti content of the Mo—Ti alloy is in a range of about 10% to about 90% by atomic weight.

10. A fabricating method of an array substrate for a liquid crystal display device, comprising:
    forming a gate pattern on a substrate, the gate pattern including a gate electrode and a gate line;
    forming a gate insulating layer on the gate pattern;
    forming a semiconductor layer on the gate insulating layer;
    forming a data pattern over the semiconductor layer, the data pattern including source and drain electrodes and a data line;
    forming a passivation layer on the data pattern; and
    forming a pixel electrode connected to the drain electrode and being located on the passivation layer,
    wherein the step of forming at least one of the gate pattern and the data pattern includes forming a first metal layer including molybdenum (Mo)-titanium (Ti) alloy and forming a second metal layer including one of copper (Cu), aluminum (Al), silver (Ag) and gold (Au) on the first metal layer, wherein the second metal layer is substantially covered by a diffusion layer which has Ti diffused from the first metal layer.

11. The method according to claim 10, wherein the diffusion layer is formed by a heat treatment process.

12. The method according to claim 10, further comprising forming a data pad formed of the same material as the data pattern.

13. The method according to claim 10, further comprising forming a gate pad formed of the same material as the gate pattern.

14. The method according to claim 10, wherein the first metal layer acts as a barrier layer for the second metal layer.

15. The method according to claim 10, wherein a Ti content of the Mo—Ti alloy is in a range of about 10% to about 90% by atomic weight.

16. A semiconductor device, comprising:
    a substrate having source and drain regions;
    a gate insulating layer on the substrate;
    a gate electrode on the gate insulating layer;
    an interlayer on the gate electrode;
    a source electrode connected to the source region; and
    a drain electrode connected to the drain region,
    wherein at least one of the gate electrode, the source electrode and the drain electrode includes a first metal layer of molybdenum (Mo)-titanium (Ti) alloy, a second metal layer of one of metallic metals including copper (Cu), aluminum (Al), silver (Ag) and gold (Au) on the first metal layer, wherein the second metal layer is substantially covered by a diffusion layer which has Ti of the first metal layer.

17. The device according to claim 16, wherein a Ti content of the Mo—Ti alloy is within a range of about 10% to about 90% by atomic weight.

18. A fabricating method of a semiconductor device, comprising:
    forming a gate insulating layer on the substrate having source and drain regions;
    forming a gate electrode on the gate insulating layer;
    forming an interlayer on the gate electrode;
    forming a source electrode connected to the source region; and
    forming a drain electrode connected to the drain region,
    wherein at least one of the gate electrode, the source electrode and the drain electrode includes a first metal layer of molybdenum (Mo)-titanium (Ti) alloy, a second metal layer of one of metallic metals including copper (Cu), aluminum (Al), silver (Ag) and gold (Au) on the first metal layer, wherein the second metal layer is substantially covered by a diffusion layer which has Ti diffused from the first metal layer.

19. The method according to claim 18, wherein a Ti content of the Mo—Ti alloy is within a range of about 10% to about 90% by atomic weight.

* * * * *